April 25, 1944.  C. F. WALLACE  2,347,345
RADIOMETEOROGRAPH TRANSMITTING APPARATUS
Filed Dec. 31, 1941  6 Sheets-Sheet 1
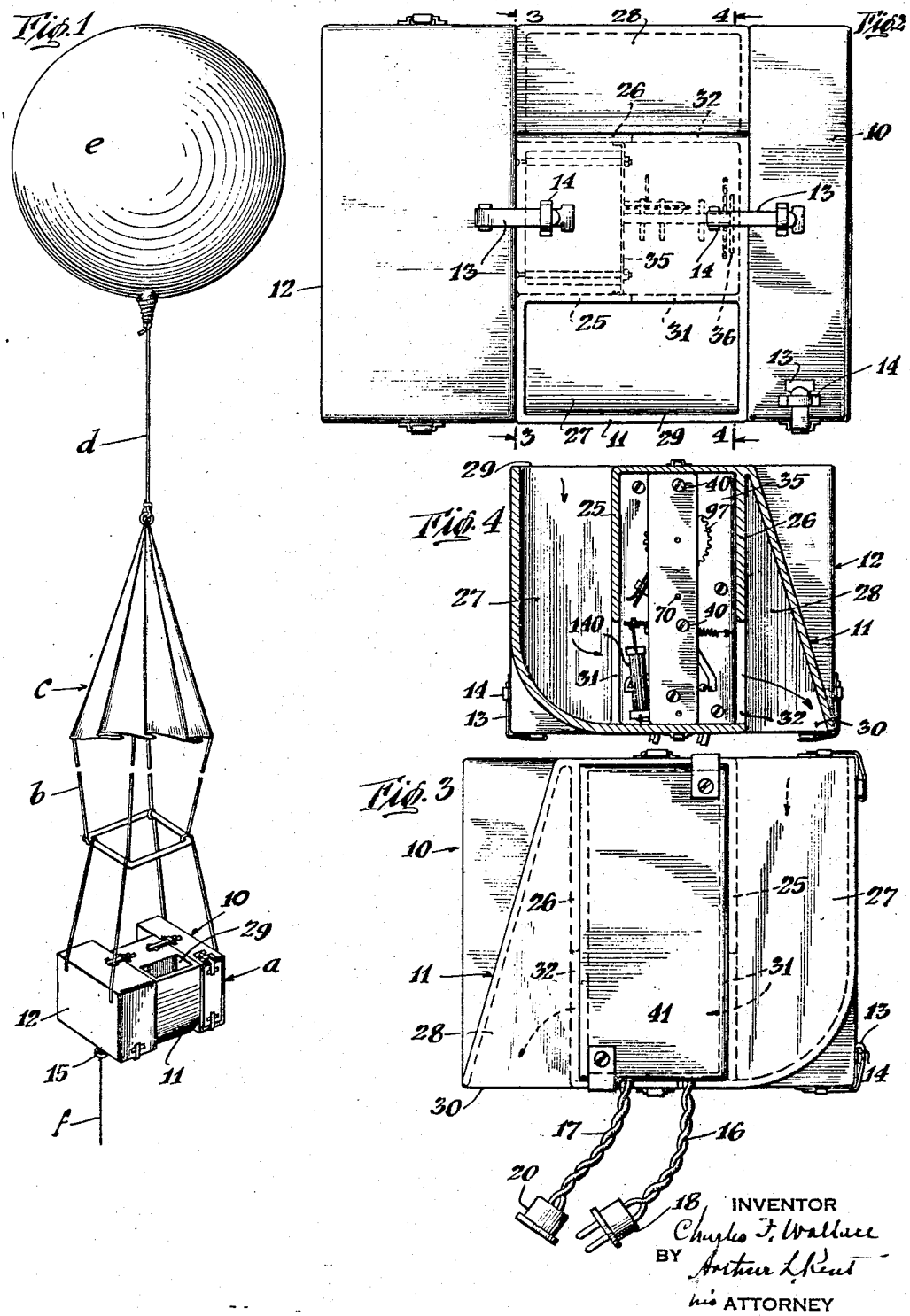

April 25, 1944.   C. F. WALLACE   2,347,345
RADIOMETEOROGRAPH TRANSMITTING APPARATUS
Filed Dec. 31, 1941   6 Sheets-Sheet 2

INVENTOR
Charles F. Wallace
BY
his ATTORNEY

April 25, 1944. C. F. WALLACE 2,347,345
RADIOMETEOROGRAPH TRANSMITTING APPARATUS
Filed Dec. 31, 1941 6 Sheets-Sheet 3
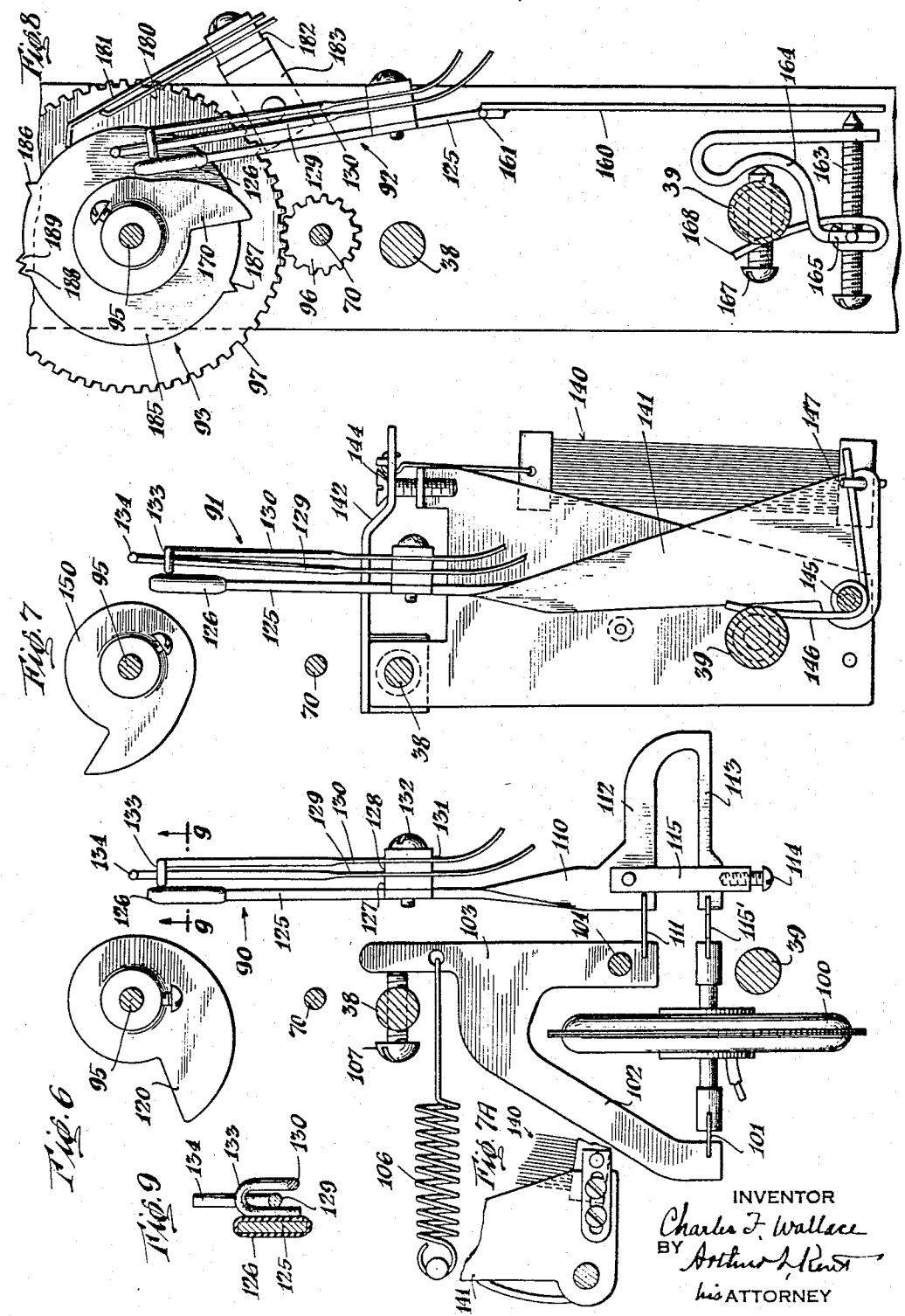
INVENTOR
Charles F. Wallace
BY Arthur L. Kent
his ATTORNEY April 25, 1944.   C. F. WALLACE   2,347,345
RADIOMETEOROGRAPH TRANSMITTING APPARATUS
Filed Dec. 31, 1941   6 Sheets-Sheet 4
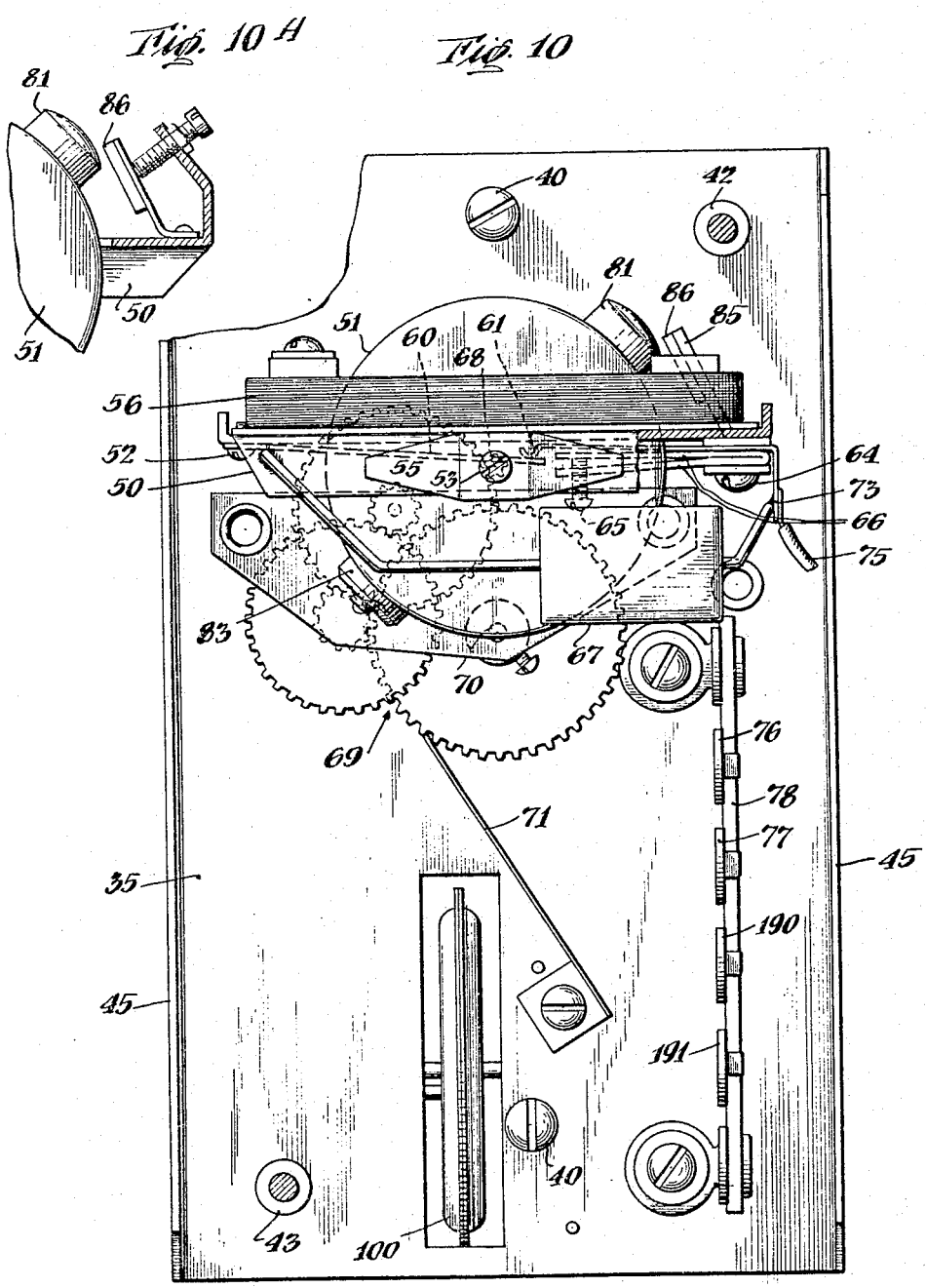

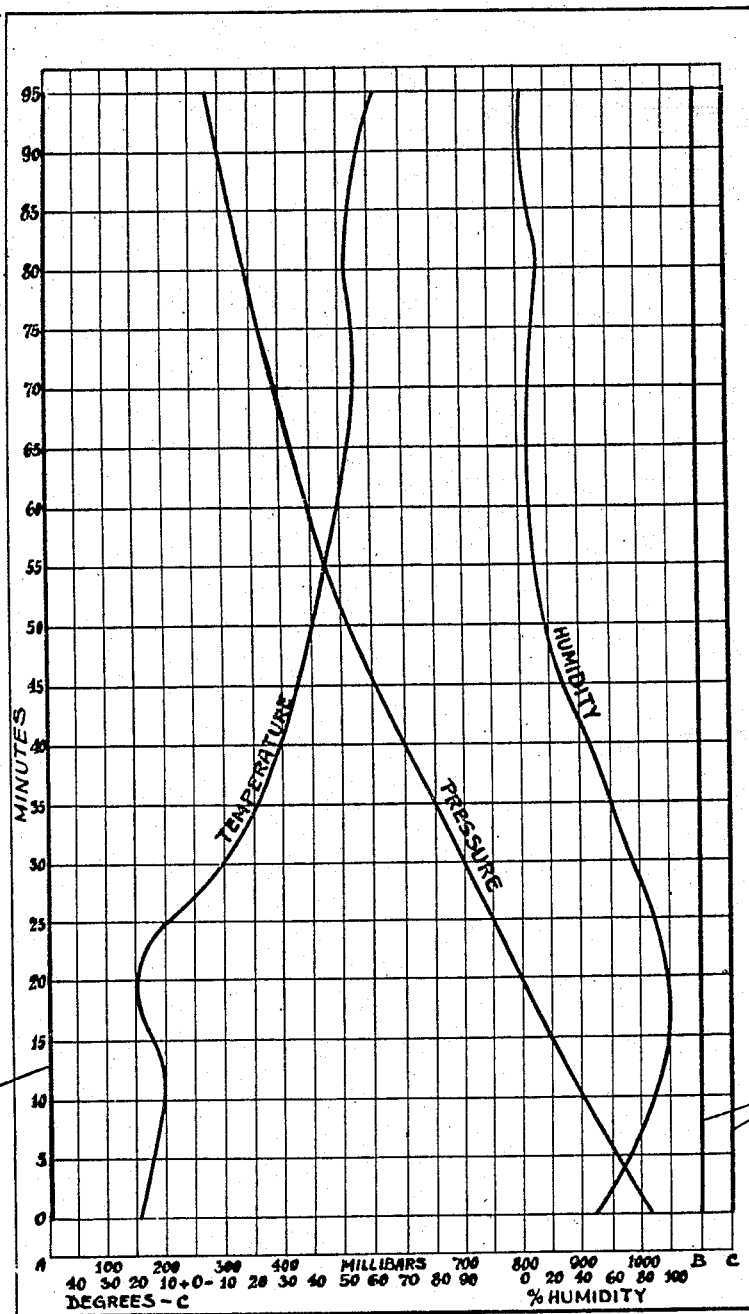

April 25, 1944.   C. F. WALLACE   2,347,345
RADIOMETEOROGRAPH TRANSMITTING APPARATUS
Filed Dec. 31, 1941   6 Sheets-Sheet 6
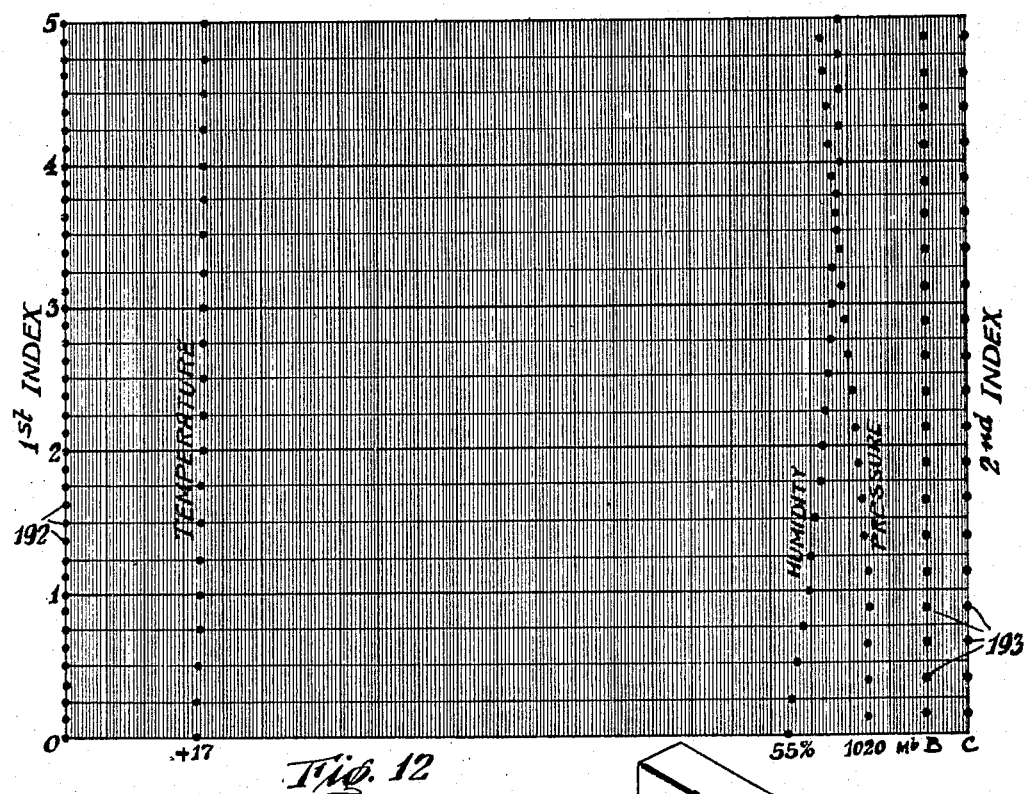
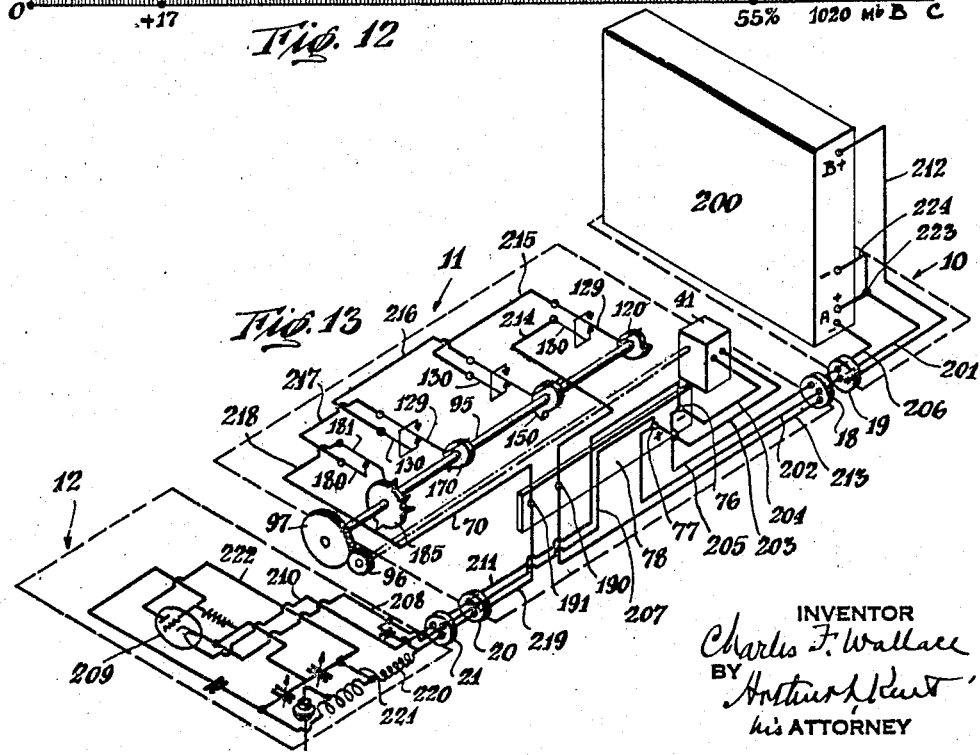
INVENTOR
Charles F. Wallace
BY
his ATTORNEY Patented Apr. 25, 1944

2,347,345

UNITED STATES PATENT OFFICE 2,347,345

RADIOMETEOROGRAPH TRANSMITTING APPARATUS

Charles F. Wallace, Westfield, N. J., assignor to Wallace & Tiernan Products, Inc., Belleville, N. J., a corporation of New Jersey Application December 31, 1941, Serial No. 425,026

8 Claims. (Cl. 177—380)

This invention relates to radiometeorograph transmitting apparatus, or radiosondes, that is, apparatus for the measurement of meteorological conditions, and especially conditions of pressure, temperature and humidity, through various levels of the atmosphere and radio transmission of the measurements to a receiver and recorder at a receiving station.

The invention aims to provide an improved time-interval radiometeorograph transmitter of comparatively very light weight and, therefore, especially suitable to be carried by small "sounding" balloons, whether free or captive, and which is reliable and accurate in operation, of comparatively low cost and adapted for mass production, easily calibrated, has a linear, or straight-line, or other desired calibration, and is capable of being more readily repaired and adjusted in the field than most radiometeorograph transmitters of the prior art, and which has other advantages which will appear from the following description.

The invention is based on the radiometeorograph transmitting apparatus of my copending patent application Serial No. 327,767, filed April 4, 1940, and apparatus according to the present invention embodies many of the features of the invention claimed in said application.

The present invention includes the following improvements: Improvements in the container in which is housed the driving motor and the meteorological circuit-controlling and indexing circuit-controlling devices, whereby a free flow of air past the temperature- and humidity-sensitive elements is obtained while the electrical contacts and conducting parts of the circuit-controlling devices are out of direct air flow and thus protected from rain and moisture, now the subject matter of my divisional application Serial No. 461,325, filed October 8, 1942; improvements in the meteorological circuit-controlling devices, or telemetering transmitting instruments, achieving reduction in weight together with great accuracy and reliablity and ease of adjustment, now the subject matter of my divisional applications Serial No. 461,326, filed October 8, 1942, and Serial No. 462,125, filed October 15, 1942; improvements in the driving motor, providing an improved governor construction including means for compensating for the effect of temperature changes on the action of the governor, now the subject matter of my divisional application Serial No. 528,072, filed March 25, 1944; improvements in the means for operating the contact members of the meteorological telemetering transmitting instruments; and an improvement in the indexing circuit-controlling means and the timing of the meteorological circuit-controlling devices whereby two reference and recorder-starting impulses are transmitted during each cycle of operations of the transmitter to cause for each cycle of the transmitter two sweeps of the recorder stylus, the operation of the meteorological circuit-controlling devices being timed to cause the measurement impulse for one of the atmospheric conditions to be transmitted during one of the two sweeps of the recorder stylus and the measurement impulses for the two other atmospheric conditions to be transmitted during the other sweep of the recorder stylus produced during each operation cycle of the transmitter. Other features of the new invention will appear from the following description.

As a full understanding of the invention can best be given by a detailed description of a transmitter embodying the various features of the invention in the form now considered best, such a description will now be given in connection with the accompanying drawings, in which:

Fig. 1 shows a radiometeorograph transmitter according to the invention as it appears attached to a sounding balloon in flight;

Fig. 2 is a top plan view of a radiometeorograph transmitter according to the invention intended especially for use with free sounding balloons;

Fig. 3 is a view taken on line 3—3 of Fig. 2, showing the side of the middle container which houses the driving motor and the meteorological circuit-controlling devices and the indexing circuit-controlling device;

Fig. 4 is a sectional view taken on line 4—4 of Fig. 2;

Figure 5:
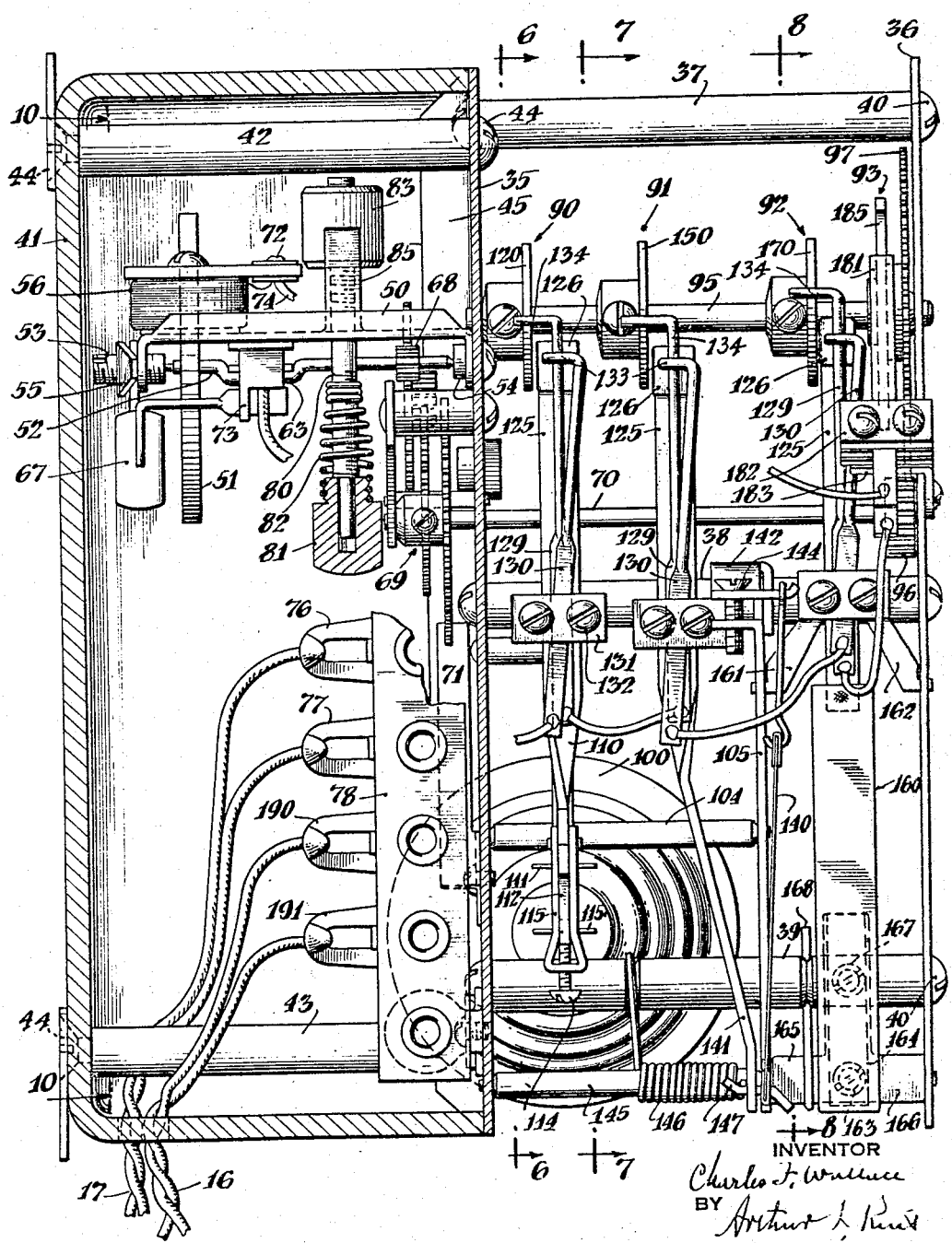
Fig. 5 is an enlarged side view of the meteorological circuit-controlling devices and the indexing circuit-controlling device and the motor with the motor casing shown in section.

Figs. 6, 7 and 8 are views, respectively, of the pressure responsive, humidity responsive and temperature responsive circuit-controlling devises, taken on lines 6—6, 7—7 and 8—8 of Fig. 5;

Fig. 7a is a detail view of an alternative connection between the hygrometer element of the humidity-responsive instrument and its pivoted support member, the view taken looking from the right in Fig. 5;

Fig. 9 is an enlarged detail sectional view taken on line 9—9 of Fig. 6 showing the contact make-and-break members, or contact assembly, which is the same in all three of the meteorological circuit-controlling devices;

Fig. 10 is a side view showing the driving motor and the motor casing sectioned on line 10—10 of Fig. 5;

Fig. 10a is a detail view showing an alternative means for adjusting the speed of the driving motor;

Fig. 11 shows a record chart having indicated thereon a characteristic record of the type obtained with a high-altitude free-flight radiometeorograph transmitter according to the invention;

Fig. 12 is a distorted enlarged view showing the first five minutes portion of the chart of Fig. 11 enlarged about twelve times vertically and somewhat less than one-half times horizontally; and Fig. 13 is a wiring diagram of a complete apparatus according to the invention for transmitting signals as momentary interruptions in a continuous signal.

Referring to the drawings, Fig. 1 shows the complete radiometeorograph transmitter $a$ as it appears in flight suspended by cords $b$ from a small parachute $c$ which in turn is suspended by cord $d$ from a small free balloon $e$ inflated to a predetermined degree, an antenna $f$ extending downward from the radio transmitter casing. The customary swivel connection between the transmitter and the parachute may of course be used.

The complete radiometeorograph transmitter comprises three principal parts housed in three separate containers 10, 11 and 12, batteries forming the power source being in container 10, the meteorological transmitter, which controls the circuit to the radio transmitter, comprising the driving motor and the meteorological circuit-controlling instruments or devices and the indexing circuit-controlling device, in container 11, and the radio transmitter in container 12, the three containers with their enclosed apparatus parts being assembled and secured together as shown in Fig. 2. Each of the containers 10, 11 and 12 is made of corrugated paper, balsa wood or other suitable light-weight heat-insulating material, and are most desirably coated on the outside with a glossy white waterproof paint or made of a suitable light-reflecting material to limit the absorption of heat from the sun's rays. The three containers are secured together, with container 10 on one side and container 12 on the opposite side of container 11, by suitable connecting means adapted to permit ready separation of the containers and ready connection thereof in assembled relation, such as the soft metal tongues 13 extending from the top and bottom of the end containers and passed through and bent back over keepers 14 on the central container. This is the unit type of construction claimed in my said application No. 327,767, having the advantages that in the event of damage to any unit the damaged unit may easily and quickly be disconnected and a new like unit substituted, and that the radio transmitter can be rapidly interchanged with one designed for operation on a different frequency or having some other different characteristic. Instead of batteries, other types of power supplies can be used or readily substituted.

The antenna $f$ extends from a small antenna insulator 15 set into the bottom wall of the container 12 which houses the radio transmitter. The antenna for the radio transmitter shown is preferably a half wave antenna, but any suitable type antenna may be used depending on the type of radio transmitter and method of antenna coupling used. The antenna is preferably made of copper-clad or copper-plated wire of small diameter so that it will not become permanently distorted if hit by some object when the balloon is launched. For making the necessary electrical connections between the apparatus parts housed in the three containers, cables 16 and 17 extend from the bottom of the central container 11, the cable 16 carrying a plug 18 to connect with a socket 19 (Fig. 13) in the bottom of container 10, and cable 17 carrying a socket 20 for connecting with a plug 21 (Fig. 13) in the bottom of container 12.

The central container 11 is divided interiorly by partitions 25 and 26 into a middle compartment which is open at one side of the container and in which the motor and the meteorological and indexing devices are housed and two end compartments 27 and 28, the end compartment 27 having an air inlet opening 29 at the top and end compartment 28 having an air outlet opening 30 at the bottom. The partition 25 has an air inlet opening 31 and partition 26 has an air outlet opening 32, these openings being in the lower part of the respective partitions and to one side toward the closed side of the container in line with the temperature-responsive and humidity-responsive elements of the meteorological devices. Most desirably, the inlet opening 29 and the passage from it to inlet opening 31 are substantially larger than the opening 31, and the bottom outlet opening 30 and the passage to it from outlet opening 32 are substantially larger than opening 32. There is thus provided a passage for unretarded flow of air from the inlet opening 29 at the top of compartment 27 to the inlet opening 31 to that portion of the middle compartment in which the temperature and humidity elements are located, and from the opening 32 to the outlet opening 30 at the bottom of compartment 28. These elements will thus be continuously laved by an air current flowing through the lower part of the middle compartment while the transmitter is ascending, while the contacts and conductors of the meteorological and indexing devices, which are located in the upper part of the middle compartment, are out of the path of air flow and protected against rain or snow and against direct access of any airborne moisture, and are also fully shielded from the sun's rays.

By shaping and proportioning the air flow passage in accordance with Figs. 2, 3 and 4, there is obtained a maximum velocity of air through the instrument chamber, which results in the pressure and humidity elements indicating substantially the conditions exterior to the case at a level of ascent corresponding to the position of the radiometeorograph. The pressure differential under which air is moved through the instrument chamber is, because of the relatively large air inlet and outlet passages leading from the top and to the bottom of the casing, greater than it would be if such passages were only as large as the openings into and from the instrument chamber.

The power source housed in container 10 for supplying current for the radio transmitter and the driving motor may consist of a 6-volt filament, or A, battery and a plate, or B, battery, for example, a 90-volt battery. Radiometeorograph transmitters for free-flight balloons usually have a low powered radio transmitter, and for such transmitters, batteries of the primary, or dry cell, type are suitable. When higher powered radio transmitters are used, or greater duration of operation required, and when the apparatus is of the continuous signal type, miniature "A" and "B" batteries of the secondary, or storage cell, type may be used, and batteries of this kind are indicated in Fig. 13.

The driving motor and the meteorological and indexing circuit-controlling devices together with their mountings, housed in container 11, form, as shown by Fig. 5, a structure complete in itself which may as a unit be inserted into and removed from the middle compartment of the central container 11. The supporting structure for these apparatus parts comprises a support plate 35 on one side of which the driving motor is mounted, and a plate 36 spaced off from the other side of plate 35 by means of spacing posts 37, 38 and 39 to which the plates are secured by screws 40, between which plates the circuit-controlling devices which control the circuit to the radio transmitter are mounted side by side. The motor is enclosed by a casing 41 of corrugated paper, balsa wood or other light-weight material secured by spacing bars 42 and 43 and screws 44, the plate 35 having side flanges 45 between which the sides of the casing 41 fit. The plate 35 and the casing are of a size to fit through the open side of the container into the middle compartment of the container so that when this unitary structure comprising the operating parts of the transmitter is positioned in the middle compartment it will be steadily positioned within the container. When so positioned the outer wall of casing 41 is desirably flush with the adjacent walls of the end compartments of the container. The cables 16 and 17 extend through openings in the bottom wall of casing 41 near the outer wall thereof and through notches in the bottom wall of the container.

Any suitable light weight motor may be used for driving the cam shaft of the circuit-controlling devices. I prefer a motor such as shown in Figs. 5 and 10. This motor is in most respects like the motor shown in my said application No. 327,767, and is of the general type disclosed and claimed in the Wallace U. S. Patent No. 1,985,357 and the Wallace and MacKay U. S. Patent No. 2,181,841.

Referring to Figs. 5 and 10, the parts of the motor are carried by a frame 59 of sheet brass or aluminum or other suitable material which is secured to and extends out at right angles from the plate 35. The rotor 51 is a magnet having a north pole and a south pole and which to secure better dynamic balance and permit greater speed of rotation is most desirably circular rather than of the bar magnet type. The rotor is mounted fast on a shaft 52 which has reduced ends journalled in bearings in holders 53 and 54 mounted in opposite end flanges of the frame 50. These bearings are most desirably as shown and described in my said application No. 327,767. The bearing holder 53 is adjustable, being threaded and screwed through a tapped hole in a frame flange and through a tapped hole in a flat spring 55, the ends of which bear against the frame flange and which acts as a locking member to maintain the bearing member in fixed position against the effects of vibration. The rotor extends into a magnetic field created by an air core solenoid 56 which serves as the stator and which is mounted on the frame 50.

The commutation contacts of the motor are provided by a movable contact member 60 and a stationary, or substantially stationary, contact member 61. The movable contact member is formed by a piece of spring silver wire secured to the frame 50 by a grounding screw 62 and the free end of which extends past an eccentric, or cam, portion 63 of the rotor shaft and is tensioned to bear against this eccentric portion of the shaft during at least a part of the revolution of the shaft. The stationary contact member 61 is formed by a strip of spring silver one end of which is insulated from the frame and secured by a screw 64 and the free end of which extends in position to be engaged by the end of the movable contact when the latter is moved by the eccentric part of the shaft. This contact strip 61 is tensioned toward the end of the movable contact wire and is held in position for engagement by the movable contact by an adjusting screw 65 screwed though two metal strips 66 also secured by the screw 64 and insulated from the frame. The two metal strips through which screw 65 extends are held by the screw under tension to move toward or from each other, thus serving as a lock for the screw. As the rotor shaft rotates, intermittent contact is made between the movable and stationary contact members, and, the eccentric portion 63 of the shaft being properly positioned angularly in relation to the plane of the stator coil and the magnetic axis of the magnet, rotation of the shaft and rotor results. In order to reduce or eliminate sparking at the contacts 60 and 61 a small condenser resistor unit 67 is provided supported and electrically connected in position to shunt the contacts.

The rotor shaft carries a small pinion 68 by which through a train of reduction gearing 69 a shaft 70 for driving the cams of the meteorological devices and indexing device is driven. This shaft 70 extends through the support plate 35 and its outer end has its bearing in the plate 36. The motor may be operated at different speeds, or different gear ratios may be employed, to provide for any desired speed of rotation of the driving shaft 70. A click spring 71 which meshes with the last gear of gear train 69 serves to prevent reverse movement of the motor.

The circuit of the motor is as follows: From a terminal connection 72 to and through the coil 56, thence to the frame and the movable contact 60, and from it to the stationary contact 61 to a terminal 73. Terminals 72 and 73 are connected by conductors 74 and 75 to terminal lugs 76 and 77 on a terminal strip 78 of insulating material mounted on the motor side of support plate 35.

The motor has a friction governor which is similar to but includes improvements on the governor of my said application No. 327,767. The governor comprises a rod 80 of brass or other suitable material mounted fast on the rotor shaft to extend at right angles therefrom in both directions, a weight 81 slidably mounted on one end of the rod and under tension to move toward the shaft by a coil spring 82, and a weight 83 which is longitudinally adjustable on the threaded other end portion of the rod. The inner end of the spring is adjustable longitudinally of the rod for adjustably varying the pull of the spring on the weight, as by having its reduced end engaging a threaded portion of the rod. As the shaft rotates, centrifugal force tends to cause weight 81 to move outward on the rod against the pull of spring 82. Instead of having, as in my said application, a friction ring to be engaged by the sliding weight 81, when it is moved outward by centrifugal force a distance corresponding to a certain speed of rotation of the rotor shaft, the present motor has a short friction plate 85 with a facing 86 of cork or other suitable friction material, extending in position to be engaged by the sliding weight 81 and coacting therewith for braking the motor to limit its speed. This friction plate, which may be, as shown, a turned-up strip cut from the motor frame 50, has been found entirely suitable for maintaining the motor speed accurately within predetermined very close limits, and it has the advantages over the friction ring of my said earlier application of being lighter and less costly, and the sliding weight 81 does not require a friction pad at its outer end but may have merely a plain rounded end as shown.

Instead of relying on adjustment of the governor spring 82 for adjusting the speed of the motor, the friction plate 85 may be adjustable to move its facing 86 toward or from the path of the end of weight 81, as by having the friction plate under spring tension to move outward and adjustably held by a screw, as shown in Fig. 10a, the plate as there shown being formed of a strip of suitable spring metal.

To compensate for the effect of temperature change on the force exerted by the governor spring 82, friction plate 85 may be made of a bi-metallic strip proportioned to compensate by its flexure for changes in the force of the governor spring and thus to maintain the motor speed constant regardless of temperature changes. This is a further advantage of this friction plate over the friction ring. Such temperature compensation is a feature of the new invention which is not to be limited, however, to the use of a bimetallic friction strip to be engaged by the sliding weight of the governor rod, although this provides a simple and effective embodiment of this feature of the invention which is preferable to other obvious embodiments, such as one in which a compensating strip or other device is carried by the sliding governor weight.

The meteorological circuit-controlling devices, or telemetering transmitting instruments, mounted between the plates 35 and 36 are a pressure-responsive instrument 90, a humidity-responsive instrument 91, and a temperature-responsive instrument 92. The contact members of these instruments and of the indexing circuit controlling device 93 are operated by cams on a shaft 95 extending between and journalled in the plates 35 and 36 and which is driven from shaft 70 by a pinion 96 on shaft 70 meshing with a gear 97 on shaft 95.

The pressure instrument or device 90, Figs. 5 and 6, comprises a pressure element, or barometric capsule, 100, of more or less conventional construction, consisting of two somewhat dished corrugated diaphragms of metal of high elastic limit joined together at their peripheries to form a chamber from which air is evacuated. A stud extending from one side of the capsule is pivotally connected by a transversely extending thin pivot plate or leaf of spring metal 101 to an arm 102 of a support member 103 which is mounted fast on a pintle 104 pivoted at one end in the plate 35 and at the other end in a plate 105 mounted on the posts 38 and 39, opposite edges of the pivot plate 101 being set in transverse slots in said stud and in the end of the arm 102 and being secured therein by solder. The support member 103 is held by a spring 106 against an adjustable stop formed by a screw 107 carried by the post 38. A transmitter arm 110 which carries at its outer end the circuit-controlling contact assembly is pivotally connected at its inner or fulcrum end to the support member 103 at a point adjacent the pintle 104 by a thin pivot plate or leaf of spring metal 111 extending into and soldered in transverse slots in the support member and in the transmitter arm.

The transmitter arm has at its inner end a lateral extension 112 from which extends a spring finger 113 which is pressed toward the end of the transmitter arm by an adjusting screw 114 threaded into the bight of a double bent strap 115, the ends of which extend on either side of and are secured to the end of the transmitter arm. The end of this finger 113 is pivotally connected to a stud extending from the opposite side of the capsule 100 from that from which extends the stud to which arm 102 is connected, this connection also being by a thin pivot plate or leaf of spring metal 115' extending into and soldered in transverse slots in the end of said stud and in the end of the finger 113.

A cam 120 of Bakelite or other non-conducting wear-resisting material mounted fast on shaft 95 operates the contact assembly carried by the transmitter arm 110 to open momentarily a closed circuit to the radio transmitter at a time during each revolution of shaft 95 depending on the position of the transmitter arm as determined by the condition of the pressure capsule 100 in response to atmospheric pressure.

Referring now to the circuit-controlling contact members constituting the contact assembly of the pressure instrument or device: The transmitter arm 110 carries or is extended to form a support bar or strip 125 having an insulating coating 126 on its outer end, and on this support bar at or near the inner end there is mounted a plate 127 of insulating material, and between this plate and a similar plate 128 is secured the flattened end of a spring contact rod or wire 129, preferably of silver or other rare metal. Another similar contact rod or wire 130 has its flattened end clamped between the insulating plate 128 and a third plate 131 of insulating material, the three plates being clamped together by means of screws 132, the contact rods thus being adjustable longitudinally on loosening the screws 132. The free end of rod 130 is bent transversely and then over to form a U, as indicated at 133, thus providing in effect two spaced contact terminals. The free end of rod 129 extends through the U-form end 133, and beyond 133 it is bent at right angles to form a cam-engaging end 134.

The two contact rods 129 and 130 are tensioned so that when not engaged by the cam 120 the end of rod 130 rests on the insulated end of the support bar and the end of rod 129 rests on the lower arm of the U-form end of rod 130, as appears best in Fig. 9. When the cam 120 in its revolution makes contact with the cam-engaging end 134 of contact rod 129, the rod is raised out of engagement with the lower arm of the U end of rod 130, thus opening the circuit at this point, and then as the revolution of the cam continues, the rod 129 is quickly raised further into engagement with the upper arm of the U end of rod 130, thus re-establishing contact between the two contact rods, and thereafter rods 129 and 130 are moved together until the high point of the cam has passed beneath the end 134 of rod 129, whereupon, the rods return to their position of rest on the end of the support bar. Contact between the two rods 129 and 130 is thus interrupted for a very short period, say a second or less, during each revolution of the operating cam 120, while rod 129 is moved by the cam from the lower arm to the upper arm of the U-form end of rod 130. Therefore, the transmitter circuit is interrupted at some time during the rotation of the cam, and the time in each rotation of the cam, that is, the position in time in each successive cycle of the operation of the device, depends on the angular motion imparted to the support bar 125 by the pressure element 100.

By turning the screw 114 to adjust the finger 113 toward or from the end of the transmission arm, thus varying the distance between the fulcrum plate 111 and the connecting plate 115' through which expanding and contracting movements of the capsule 100 are applied to the transmitter arm to swing it on its fulcrum 111, the magnitude of movement imparted to the transmitter arm and the contact assembly carried thereby by the barometric capsule for a given atmospheric pressure change may be adjustably varied, thereby adjustably varying the spread on the recorder chart of the data markings indicating such pressure change. By this range adjustment, therefore, variations in the expansion and contraction of the barometric capsule resulting from difference in the materials or construction of the capsule can be compensated for, and the movement of the transmitter arm can be maintained within any desired predetermined range in all instruments. Angular adjustment of the transmitter arm by means of the adjusting screw 107 determines the point on the cam, and, therefore, the time in the cycle, at which the contact assembly carried by the transmitter arm is operated by the cam for any condition of the barometric capsule, that is, for any atmospheric pressure. This adjustment, therefore, determines the time in each cycle of operations at which the pressure signals are transmitted, and, therefore, determines the position of the range of the pressure markings on the chart of the recording instrument.

Therefore, by the range adjustment by means of screw 114 the horizontal spread of the data markings on the recorder chart may be adjusted to agree with the spacing of printed pressure lines of the chart, and by the angular, or positioning, adjustment of the transmitter arm by means of the screw 107 the exact location on the chart of the data markings may be adjusted to the printed chart markings. The instrument may thus be readily calibrated so that its transmission will result in a record which may be read directly without resort to any correction factors whatever. The range of the data markings on the chart will, of course, depend primarily on the effective peripheral length of the cam, and the location on the chart of the data markings will depend primarily on the angular position of the cam on shaft 95, fine adjustment for range and position of the data markings being by means of the screws 114 and 107.

If the movement imparted to the transmitter arm 110 and to the contact assembly carried thereby is nonlinear, that is, not proportional to changes in the atmospheric pressure as measured by the barometric capsule 100, the contour of the cam 120 can be so shaped as to produce time interval increments that are linear or directly proportional to changes in atmospheric pressure. Also, the contour of the operating cam can be shaped to produce non-uniform time interval increments, thereby permitting certain portions of the pressure range to be spread out on the recorder chart in order to permit their more accurate study on the chart, in the same manner and as more fully explained in my said application Serial No. 327,767.

In the humidity-responsive instrument or device 91, shown in Figs. 5 and 7, the humidity-sensitive element 140 is of the well-known hair type, consisting of a multiplicity of hairs extending in close arrangement side by side and held at the ends by metal clips. This hygrometer element is pivotally connected at one end to one extremity of a triangular pivotally mounted support member 141 and at its other end to an arm 142 extending from the post 38, to which it is rigidly secured. The outer end of arm 142 is held by means of a screw 144 to an ear at the end of plate 105. The arm is of spring metal and sufficiently flexible so that by means of screw 144 it may be adjusted so as to change the position of the hygrometer element and thereby adjust the contact assembly of this instrument with relation to its operating cam, thereby to adjust the location on the chart of the humidity data markings, this adjustment corresponding to the adjustment by the screw 107 of the pressure instrument. The support member 141 is pivotally mounted by being carried by a shaft 145 which extends between and is pivotally mounted in the plates 35 and 105, and a coil spring 146 on shaft 145 has one end bearing on the post 39 and the other on the pivot pin 147 by which the humidity element 140 is connected to the support 141. By this spring the support 141 is constantly urged to turn on its pivot in a clockwise direction as viewed in Fig. 7, thereby maintaining the hairs of the hygrometer element under constant tension. The support member 141 carries a contact assembly which is operated by a cam 150 of insulating material on shaft 95. This contact assembly is like that of the pressure instrument and its parts are marked with the same reference numerals, and as it is operated in the same manner by its cam 150 to open the circuit momentarily at a time during each revolution of shaft 95 determined by the hygrometer element, it need not be further described. It will be understood that the support member 141 will be given a slight angular movement as the hygrometer element expands or contracts with changes in the amount of moisture present in the atmosphere, this movement of the support member causing its contact assembly to move toward or from the cam. This humidity-responsive instrument has no range adjusting means for varying the spread of the humidity markings on the record chart. The range depends on the length of the hairs, and is determined by cutting the hairs to the correct length.

If it is desired to provide for range adjustment of the humidity-responsive instrument, this may be done by providing means for varying the effective leverage with which the hygrometer element acts to turn the support member 141 against the force of spring 146. As shown in Fig. 7a, the end of the hygrometer element 140, instead of being connected directly to the support member 141, is connected to a piece 141a which is slotted and secured to the support member by two screws 141b so that the piece 141a may be adjusted on the support member to move the point of connection thereto of the hygrometer element toward or away from the pivotal axis, or fulcrum, of the support member.

The temperature-responsive instrument 92 is shown in Figs. 5 and 8. The temperature-responsive element 160 of this instrument as shown is a thin bi-metallic plate, or strip, rigidly spot-welded or otherwise rigidly connected to the inner end of the support bar 125 of the contact assembly of this instrument which is the same as the contact assemblies of the pressure and humidity instruments, except that the support bar 125 of this contact assembly is pivotally mounted by means of arms 161 and 162 the reduced ends of which extend into pivot openings in the plates 105 and 36, respectively. The contact assembly is operated by a cam 170 of insulating material on the shaft 95. The other end of the bi-metallic strip 160 is free except that as it flexes under drop in temperature it bears against an adjustable abutment formed by a screw 163 carried by a pivoted member 164. Member 164 is formed by a metal strip bent to generally U-shape, one of its arms being curved to clear the post 39 and having lateral extensions 165 and 166 at its end which have reduced ends extending into pivot openings in the plates 105 and 36, respectively. The screw 163 is threaded through the two ends of the strip forming the member 164, these ends being spaced apart as shown in Fig. 8.

A screw 167 carried by post 39 holds member 164 against being turned in anti-clockwise direction as viewed in Fig. 8 by a spring 168 which is rigidly secured to the end extension 165 and bears against post 39. By means of this screw 167 the member 164 may be adjusted angularly to move the abutment end of screw 163 longitudinally of the bimetallic strip, thereby changing the effective length of the strip and, therefore, the magnitude of the movement imparted to the contact assembly by this temperature-responsive strip or element for a given temperature change, this being the range adjustment whereby the spread on the recorder chart of the data markings indicating temperature change is determined. Adjustment for positioning the time in the cycle of operations at which the contact assembly of this instrument is operated by the cam for any temperature condition of the atmosphere, thereby determining the time in each cycle of operations at which the temperature signals are transmitted and, therefore, the position of the range of pressure markings on the recorder chart, is effected by adjustment of the screw 163. The time in the cycle at which the signal is transmitted by this instrument depends on the relative resistance to flexure of the bi-metallic strip 160 and the spring contact rod 129, opening of the circuit by engagement of the cam 170 with the end 134 of contact rod 129 taking place only when the resistance of the bi-metallic strip exceeds that of the contact rod.

The present instrument, having its bi-metallic strip rigidly connected to the inner end of a pivoted arm which carries the contact assembly and its other end free and merely engaging an adjustable abutment, has the advantage that the contact assembly has a shorter movement for a given flexure of the bi-metallic strip than in the temperature-responsive instrument of my said application No. 327,767. The bi-metallic strip may, therefore, be longer and thinner, giving greater sensitivity of response. And as the bi-metallic strip is not under sufficient tension to have a pronounced natural period, vibration under shock is avoided. Also, the range adjustment by adjusting the abutment lengthwise of the bi-metallic strip to change the effective length of the strip is less critical than the corresponding adjustment of the former instrument.

The period of interruption of the circuit between rods 129 and 130 of the contact assembly of each of the meteorological instruments depends on the spacing of the arms of the U-form end 133 of rod 130 and the steepness of the cam which moves rod 129. As the steepness or rate of rise of the cams of the different instruments is not the same, the U-form ends 133 have, most desirably, different degrees of spacing of their arms, so that the period of interruption shall be substantially the same for all the instruments, the spacing being correspondingly greater as the cam is steeper. Since the recording of humidity is to be confined to a relatively narrow strip of the record chart, the humidity cam is much shorter and steeper than the pressure and temperature cams. If a gap between the arms of the U-form end of the humidity contact assembly were the same as in the temperature and pressure contact assemblies, the period of interruption would be very much less and might not be sufficient for proper response of the recorder.

The indexing circuit-controlling device 93, shown in Figs. 5 and 8, comprises a contact assembly formed by a contact rod 180 and a spring contact rod 181, both held and insulated from each other by a clamping pile 182 carried by a bracket 183 attached to the plate 36, and a cam disc 185 on shaft 95. This cam disc 185 has two short peripheral projections 186 and 187 at diametrically opposite points of the disc, and has spaced a short distance ahead of the cam projection 186 in the direction of rotation of the disc two closely spaced short peripheral projections 188 and 189. Contact rod 181 is tensioned toward rod 180 and is normally in circuit-closing engagement with the end of rod 180, and its end beyond the end of rod 180 extends toward the periphery of the cam disc in position to be engaged and moved by the cam projections 186, 187, 188 and 189 to open the circuit. The two contact rods, as shown in Fig. 5, are connected in series with the contact assemblies of the meteorological instruments between terminal lugs 190 and 191 on the terminal strip 78.

The cam projections of the cam disc 185 are so positioned on the periphery of the disc and the disc is so positioned angularly on the shaft 95 with relation to the angular positions of the cams 120, 150 and 170 of the meteorological instruments, that the cam projection 186 operates the contact rod 181 to open the circuit momentarily at the beginning of each cycle of operations, the cam projection 187 operates to open the circuit momentarily at the midpoint of each cycle, and the dual projections 188 and 189 cause two closely spaced momentary openings of the circuit at the end of each cycle after the three meteorological instruments have made their circuit interruptions. Unlike the interruptions made by the meteorological instruments, the circuit interruptions caused by the projections on the cam disc 185 always occur at predetermined points in the cycle, and, therefore, if the speed of the transmitter motor is constant, the time interval between the circuit opening caused by projection 187 and those caused by projections 188 and 189 will be constant, and the distance between the record markings caused by these circuit openings will not vary in successive cycles, provided the speed of the recorder motor is also constant.

The cams 120, 150, 170 and 185 are independently adjustable angularly on shaft 95 so that they may be set in any desired relative angular position. This separate adjustment of cams 120, 150 and 170 provides for making coarse, or approximate, adjustment of the time in each cycle of operations at which the pressure, humidity and temperature signals are transmitted, and, therefore, of the position of the range of pressure, humidity and temperature markings on the chart of the recording instrument. The transmitter illustrated has been operated at a speed of four cycles, that is, four rotations of cam shaft 95, per minute, but this speed may, of course, be varied.

Most desirably, the recording devices at the receiving stations receiving the signals transmitted by transmitters according to the present invention are of that type which have a synchronizing means whereby the pen arm of the recorder immediately returns rapidly to its starting position after completing its recording stroke and is then held at that point until a reference and starting signal is again received from the transmitter. Such a recorder is shown in my co-pending application Serial No. 371,618, filed December 26, 1940.

For receiving the radio signals, I prefer to employ what is known as a super-regenerative receiver because of its great sensitivity at the ultra-high frequencies commonly used for radiometeorograph transmission, also because receivers of this type have inherent automatic volume control properties and are quite broad in their tuning so that small departures from the ground level frequency of the radiometeorograph transmitter does not prevent reception of the signals. Furthermore, if the frequency of the transmitter continues to drift it is quite easily followed on account of the broad tuning that is characteristic of super-regeneration.

In the illustrative embodiment of the invention shown in my said application Serial No. 327,767, the indexing circuit-controlling device causes a reference signal to be transmitted at the beginning of each cycle of operations of the transmitter, causing for each cycle a single signal recording sweep of the recorder over the record chart during which the pressure, humidity and temperature signals are received and recorded. According to one feature of the present invention and in the embodiment shown in the drawings of this application, two reference and starting signals are transmitted during each cycle of operations of the transmitter, one at the beginning of each cycle and the other at the midpoint of the cycle, causing for each cycle of the transmitter two recording sweeps of the pen arm of the recorder, and the meteorological signals are divided between these two halves of the cycle, one or two of the meteorological signals being transmitted during the first half of the cycle and recorded during the first sweep of the pen arm of the recorder, and the other two or one during the second half of the cycle and recorded during the second sweep of the pen arm. Preferably, and as shown, the temperature and humidity signals are sent during the first half of each cycle and the pressure signal during the second half.

The relative angular settings of the cams 120, 150 and 170 and cam disc 185 are, therefore, such that in each cycle, that is, for each revolution of the shaft 95 and cams carried by it, the temperature cam 170 operates its contact device first, then the humidity cam 150 operates its contact device, and then the pressure cam 120 operates its contact device. The projection 186 of cam disc 185 operates just prior to cam 170 of the temperature instrument at the high temperature end of its range, that is, just before the temperature instrument can cause a circuit interruption corresponding to the temeprature at the start of the flight, the opening of the circuit by this cam projection 186 sending a reference and starting signal which starts the recorder pen arm on a recording sweep. After the temperature signal has been sent and recorded, the humidity signal is sent and recorded. Then a second reference and starting signal is transmitted by operation of the cam projection 187 to again release the recorder pen arm which has been returned to its starting position. Then after cam 120 has operated to cause transmission of the pressure signal, the dual cam projections 188 and 189 operate to send a motor speed check signal just after the high end of the range of the pressure instrument and just before the end of the second sweep in the cycle of the recorder pen arm.

A chart with a characteristic record made by a recorder of the kind referred to receiving signals from a radiometeorograph transmitter according to the invention is illustrated in Fig. 11, the recordings, because of the reduced size of the chart as shown and of the closeness in vertical direction of the dots made by the recorder stylus, being shown as continuous lines. Fig. 12 shows the first five minutes portion of the chart of Fig. 11 enlarged about twelve times vertically and somewhat less than one-half times horizontally. In this enlarged showing of a portion of the chart the data markings appear as separate dots. The dots 192 in vertical line at the left hand side of the chart are those produced by the reference and recorder-starting signals, there being two for each cycle of operations of the transmitter, and the transmitter operating at the rate of four cycles per minute. In line approximately horizontally with the first reference dot made in each cycle there is a temperature recording dot and a humidity recording dot, and in line approximately horizontally with the second reference dot in each cycle produced by the second reference and starting signal there is a pressure recording dot, and at the right hand side of the chart are two closely spaced motor-speed-indicating, or -check dots marked 193 produced by the signal interruptions caused by the cam projections 188 and 189 of the indexing cam disc 185. If the motor speed is constant, there will be no change in successive cycles of operation in the time interval between the instant at which the reference signal is caused by the cam projection 186 and the instant at which the speed-indicating signal is caused by the cam projections 188 and 189, and, as a consequence, the speed of the recorder motor also being constant, the speed-indicating double line 193 will have no horizontal displacement. Any increase in the speed of the transmitter motor as compared to the speed of the recorder motor will be indicated by displacement of the double line 193 to the left, and any decrease will cause the double line 193 to be displaced to the right. By adjustment of the speed of the recorder motor any such departure from the proper speed ratio between the motors may be readily corrected.

The speed check signal may be made to serve also as an identifying signal by providing the proper cam projections on the indexing cam disc 185 to produce a check line 193 of an identifying character, such as, for example, a particular spacing of two or three dots. This is of value when two radiometeorographs are in operation on adjacent radio frequencies.

When the contact assemblies of the apparatus are of the kind shown, the radio transmitter is caused to transmit continuous signals in which momentary interruptions are caused during each cycle of operations by the several meteorological instruments and by the indexing device, the contact assemblies of which are connected in series between the terminal lugs 190 and 191. Each meteorological instrument operates, as described, to open the circuit momentarily during each cycle of operations at a point determined by the meteorological condition measured by it. There is also a very short opening of the circuit when the cam-engaging end 134 of each contact rod 129 drops off from the high point of its operating cam, but these circuit openings are too short to be effective in causing record-producing operation of a properly designed recording apparatus.

Instead of the normally closed-circuit contact assemblies shown, the new telemetering transmitter may obviously be provided with normally open-circuit contact assemblies, such as, for example, the open-circuit contact assemblies shown and described in my said application No. 327,767, making the apparatus of the normally open-circuit type by which intermittent radio impulses are transmitted, the contact assemblies then being connected in parallel instead of in series as described in my said application.

In the wiring diagram, Fig. 13, the three containers 10, 11, 12, housing various parts of the complete radiometeorograph transmitter are indicated by dotted lines. A combined storage "A" and "B" battery 200 is shown as in container 10. The contact assemblies and operating cams of the pressure, humidity and temperature instruments and of the indexing device and the motor and drive shaft are indicated as in container 11, and a radio transmitter of the well-known Colpitts type is indicated as in container 12. As any suitable type of radio transmitting apparatus and circuits may be used in radiometeorograph transmitters according to the invention, no description of the radio transmitter shown or of its operation is needed for a full understanding of the invention.

The contact assemblies of the meteorological instruments as indicated in this figure are of the closed-circuit type, transmitting a continuous signal except for momentary interruptions by the meteorological instruments and the indexing device, the contact assemblies being connected in series.

In the operation of the radiometeorograph transmitter as illustrated by this figure:

Current flows from the positive side of the 6-volt A battery section of the combined storage battery 200 through wire 201 and one sleeve of the socket 19 to the coacting prong of plug 18, and then through a conductor 202 to the positive 6-volt terminal 77 on the terminal strip 78, and then by a lead 203 to one side of the driving motor in the housing 41. The other side of the motor is connected by wire 204 to the negative 6-volt terminal 76 and then by conductor 205, another prong of plug 18 and coacting sleeve of socket 19 and wire 206 to the negative side of the low voltage section of the battery.

Current at a potential of 6 volts is also caused to flow in a circuit starting at the positive terminal 77 through conductor 207, a sleeve and prong of socket 20 and plug 21, and wire 208 to one side of the filament, or heater, in the vacuum tube 209 of the radio transmitter, and returning from the other side of the filament through conductor 210, another prong and sleeve of plug 21 and socket 20, and by conductor 211 to the negative terminal 76.

By these circuit connections from the 6-volt section of the battery, the motor is caused to operate to drive the shaft 70 by which the cam shaft 95 is driven; and in addition, the filament and cathode of the vacuum tube 209 are energized.

Plate voltage is applied to the radio transmitter from the high voltage B battery section as follows: Current flows from the positive side of the B battery through conductor 212 and a sleeve and prong of socket 19 and plug 18, and by wire 213 to terminal 190 of the terminal strip 78; and thence by wire 214 to spring contact rod 130 of the contact assembly of the pressure unit, and, the circuit being normally closed through this contact assembly, current flows from its spring contact rod 129 through wire 215 to the contact assembly of the humidity unit, and thence by wire 216 to the contact assembly of the temperature unit, and thence by wire 217 to the contact assembly of the indexing device, and thence by wire 218 to terminal 191, from which current flows through wire 219, a sleeve and prong of socket 20 and plug 21, and thence by way of the radio frequency choke coil 220 and wires 221 and 222 to the plate of vacuum tube 209. The return circuit to the negative side of the B battery is by way of the circuit connections before described between the filament of tube 209 and the positive side of the A battery to the connecting point 223 and thence by conductor 224 to the negative side of the B battery.

The radio transmitter will thus emit electromagnetic waves from its antenna *f* except when the plate current of vacuum tube 209 is momentarily interrupted by the operation of one or another of the contact assemblies by their cams 120, 150, 170 and 155, and as these momentary interruptions caused by the cams of the pressure, humidity and temperature units bear a significant time relationship in each cycle to the positions assumed by the pressure-, humidity- and temperature-responsive elements of these units, and to the speed of the motor, they can serve to actuate or control the stylus of the recording apparatus at a distant receiving station in the known way.

The improvements described and shown herein in the container in which the meteorological circuit-controlling instruments are housed form the subject matter of my divisional application Serial No. 461,325, filed October 8, 1942; the improvements in barometric telemetering transmitters shown and described herein form the subject matter of my divisional application Serial No. 461,326, filed October 8, 1942; and the improvements in temperature-responsive telemetering transmitters shown and described herein form the subject matter of my divisional application Serial No. 462,125, filed October 15, 1942.

What is claimed is:

1. A meteorological transmitter for a radiometeorograph transmitter, comprising a plurality of circuit-controlling instruments each having an element responsive to changes in an atmospheric condition and a contact assembly comprising two relatively movable contacts, the position of the contact assembly as a whole being controlled by said element, a driving motor, a cam shaft driven by said motor, and a plurality of cams on said shaft, one for coacting with each of said contact assemblies, said cams being separately adjustable angularly on the cam shaft.

2. A meteorological transmitter for a radio-meteorograph transmitter, comprising a plurality of circuit-controlling instruments each having an element responsive to changes in an atmospheric condition and a contact assembly comprising two relatively movable contacts, the position of the contact assembly as a whole being controlled by said elements, a driving motor, a cam shaft driven by said motor, a plurality of cams on said shaft, one for coacting with each of said contact assemblies, an indexing cam on said shaft, and a contact assembly coacting with said indexing cam, said cams being separately adjustable angularly on said shaft.

3. A meteorological transmitter for a radio-meteorograph transmitter, comprising a driving motor, a plurality of circuit-controlling instruments each having an element responsive to changes in an atmospheric condition and a contact assembly comprising two relatively movable contacts, the position of the contact assembly as a whole being controlled by said element and a rotary cam driven by said motor for co-acting with said contact assembly, and indexing means operated by said motor for causing a reference and recorder-starting signal to be transmitted at the beginning of each cycle of operations and at a midpoint in each cycle and a motor-speed-check signal to be transmitted at the end of each cycle.

4. A meteorological transmitter for a radio-meteorograph transmitter, comprising a driving motor, a plurality of circuit-controlling instruments each having an element responsive to changes in an atmospheric condition and a contact assembly the position of which is controlled by said element and a rotary cam driven by said motor for co-acting with said contact assembly, and indexing means comprising a contact member and a cam disc driven by said motor having two diametrically opposite cam formations for operating the contact member to cause reference and recorder-starting signals to be transmitted at the beginning of and at a midpoint in each cycle of operations and a cam formation for operating the contact member to cause a motor-speed-check signal to be transmitted at the end of each cycle.

5. A meteorological transmitter for a radio-meteorograph transmitter, comprising a driving motor, a plurality of circuit-controlling instruments each having an element responsive to changes in an atmospheric condition and a contact assembly the position of which is controlled by said element and a rotary cam driven by said motor for coacting with said contact assembly, and indexing means comprising a contact member and a cam disc driven by said motor having two diametrically opposite cam formations for operating the contact member to cause reference and recorder-starting signals to be transmitted at the beginning of and at a midpoint in each cycle of operations and a cam formation for operating the contact member to cause a motor-speed-check signal to be transmitted at the end of each cycle, said last-mentioned cam formation being shaped to cause a signal adapted to serve also as an identification signal.

6. A meteorological transmitter for a radio-meteorograph transmitter, comprising a driving motor, means operated by said motor for causing a reference and recorder-starting signal to be transmitted at the beginning of each cycle of operations and at a midpoint in each cycle and a motor-speed-check signal to be transmitted at the end of each cycle, a circuit-controlling instrument for causing signals indicating changes in an atmospheric condition to be transmitted between the first and second reference and recorder-starting signals in each cycle of operations, and a circuit-controlling instrument for causing signals indicating changes in another atmospheric condition to be transmitted between the second reference and recorder-starting signal and the motor-speed-check signal in each cycle.

7. A meteorological transmitter for a radio-meteorograph transmitter, comprising a driving motor, means operated by said motor for causing a reference and recorder-starting signal to be transmitted at the beginning of each cycle of operations and at a midpoint in each cycle and a motor-speed-check signal to be transmitted at the end of each cycle, a plurality of circuit-controlling instruments each having an element responsive to changes in an atmospheric condition and a contact assembly the position of which is controlled by said element and a rotary cam driven by said motor for coacting with said contact assembly, the cam of one of said instruments being positioned angularly to coact with its contact assembly in that part of each cycle of operations before the midpoint reference signal, and the cam of another of said instruments being positioned angularly to coact with its contact assembly in that part of each cycle following the midpoint reference signal.

8. A meteorological transmitter for a radio-meteorograph transmitter, comprising a driving motor, means operated by said motor for causing a recorder-starting signal to be transmitted at the beginning of each cycle of operations and at a midpoint in each cycle, a circuit-controlling instrument for causing signals indicating changes in an atmospheric condition to be transmitted in the first half of each cycle, and a circuit-controlling instrument for causing signals indicating changes in another atmospheric condition to be transmitted in the last half of each cycle.

CHARLES F. WALLACE.